UNITED STATES PATENT OFFICE.

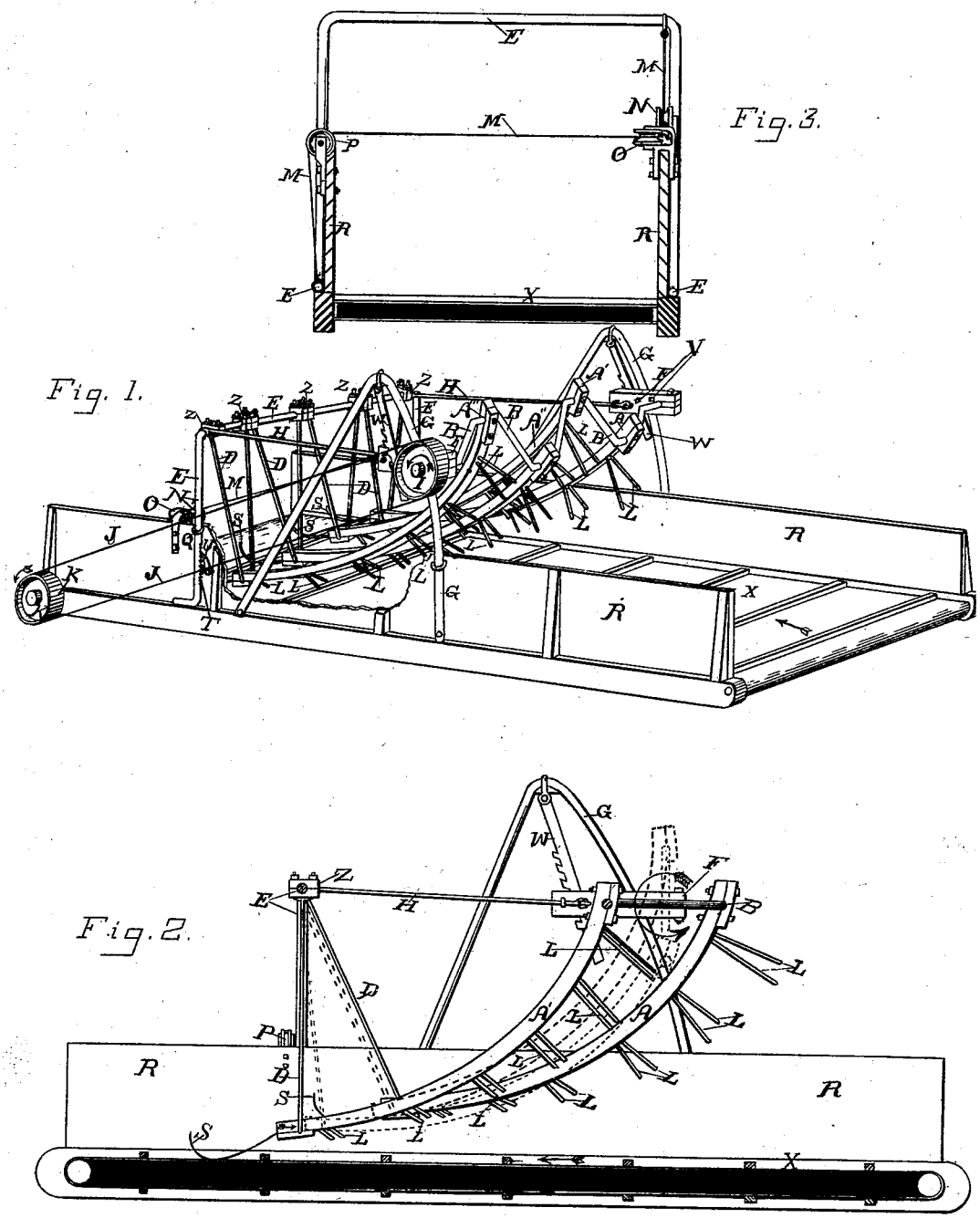

WILLIAM ELBERT PHILLIPS, OF WILMINGTON, CALIFORNIA.

THRASHING-MACHINE FEEDER.

SPECIFICATION forming part of Letters Patent No. 373,944, dated November 29, 1887.

Application filed February 19, 1887. Serial No. 228,178. (No model.)

*To all whom it may concern:*

Be it known that I, WILLIAM ELBERT PHILLIPS, a citizen of the United States, residing at Wilmington, in the county of Los Angeles and State of California, have invented a new and useful Improvement in Feeders for Thrashing-Machines, of which the following is a specification.

My invention relates to that class of thrashing-machine feeders in which the spreader-bars are operated by means of a shaft bent to form a number of cranks upon which the spreader-bars are journaled. The thrashing-machine feeders of this class which have come under my observation are objectionable in that the teeth of the spreader-bars do not properly clear themselves, and the grain is liable to be crushed and wadded by the spreader teeth and bars, thus clogging and stopping the feeder.

One object of my invention is to devise means whereby the teeth of the spreader-bars will lift and loosen the grain, and at the same time will allow only such an amount to pass along the draper as may be required to properly feed the machine.

A further object is to provide means for adjusting the feeder to feed a greater or less quantity of grain to the machine without materially affecting its operation in loosening and spreading the grain.

A further object is to devise means whereby the frame which supports one end of the spreader-bars will be caused to remain level while being raised and lowered.

I accomplish these objects by means of the feeder described herein, and illustrated in the accompanying drawings, in which—

Figure 1 is a perspective view of my improved feeder, a portion of the side of the box being broken away to show the rear ends of the feeder-bars. Fig. 2 is a longitudinal section of the same, illustrating the movement of the spreader-bars. Fig. 3 is a rear elevation of the frame which sustains the rear ends of the spreader-bars, a portion of box and feeder-frame being cut away.

A A' A" A''' are the spreader-bars, which are curved slightly at the lower or rear ends and more abruptly at the upper or front ends, which are journaled upon the cranks. The rear ends of the bars are journaled upon and supported by swinging rods D, which are journaled upon the swing-frame E.

The crank-shaft B is supported at its ends in bearings or boxes F, secured to the supports G, and braced by rods H H, rigidly secured thereto and hinged upon the swing-frame E. A pulley, I, is mounted upon the end of the crank-shaft B, and a belt, J, connects it with a pulley, K, upon the draper-drum, whereby it is revolved to rotate the crank-shaft in the same direction with the draper-drums.

The direction of the motion of the draper X is shown by the straight arrow on the draper and the direction of the rotation of the crank-shaft is shown by the curved arrow on the pulleys I K, Fig. 1.

It will be observed by reference to Fig. 2 that the curvature of the spreader-bars is such that the rear or lower portions thereof are nearly parallel with the draper during the entire revolution of the crank-shaft, while the upper or front portions of the bars are allowed to assume an angle with the draper of from sixty to eighty degrees. It will also be observed that the motion of the rear portion of the bars is approximately horizontal, and that such portion of the bars raise and lower but slightly, while the front ends move through the arc of a circle, thus giving the upper ends a vertical motion equal to the horizontal motion of the lower ends.

The spreader-teeth L L L, &c., projecting from the under side of the spreader-bars, are of different lengths. Those near the lower end are only a few inches long, and they project forward at a sharp angle with the spreader-bar, so that as the bar advances in the direction shown by the short arrow on A', Fig. 2, the tooth L will catch into the grain and drag it forward against the motion of the draper, being slightly elevated in the meantime by the swinging rod D as it is swung forward by the motion of the spreader-bar, until the tooth reaches the position shown by the tooth L on the bar A in Fig. 2. The acute angle of the teeth L causes them to lift and loosen the grain when the bar is thrown forward in the direction of the short arrow, and also causes the teeth to be withdrawn from the grain as the bar moves in the opposite direction.

It will be observed upon reference to Fig. 2 that as the spreader-bar A' moves forward the lower end thereof is raised and the upper end is lowered at first and is then raised, as shown by the dotted lines, and that as the bar is moved backward in the direction of the motion of the draper the lower end of the bar is lowered, while the upper end is first raised slightly and is then lowered.

The teeth are set at such angles with the bar at its several degrees of curvature that as they move forward and upward against the grain they will enter the grain and lift it, and as they move backward they will be withdrawn from the grain.

Upon the rear or lower end of the bars I mount springs S, to press upon the draper when there is no grain upon it, in order to hold it down and prevent the wind from blowing it up to strike upon the ends of the bars, as might sometimes occur.

It is sometimes found desirable to change the amount of grain fed to the thrasher, and for the purpose of regulating the amount I provide means for raising and lowering the rear ends of the feeder-bars. This is illustrated in Fig. 3.

The swing-frame E is secured to the sides of the box R by staples Q, which allow the frame to be moved up and down. A cord, M, is attached to one upper corner of the swing-frame E and passes downward therefrom and beneath the pulley N, mounted upon the box R, thence through the horizontal-direction pulley O, across the box R and over the sustaining pulley P, mounted upon the side of the box, and from thence downward to the bottom of the swing-frame E, to which it is attached. It will be observed by reference to Fig. 3 that when that side of the frame having the cord attached to its upper corner is raised, the other side will be correspondingly elevated by the cord M. I provide a ratchet, T, and a pawl, U, upon this side of the frame to sustain the frame when it is raised.

The clamps V, which secure the bearings F to the supports G, move freely upon the supports, so that the journals may be raised and lowered; and I provide ratchet-bars W to sustain the journals at any height desired. The supports G form arcs of a circle concentric with the shaft upon which the pulley K is mounted, so that the operation of the belt J will not be interfered with when the journals F are raised and lowered. By this means the crank-shaft is adapted to be raised and lowered to change the elevation of the front ends of the spreader-bars. It is obvious that the number of bars used and the number of teeth upon the bars may be increased or diminished without affecting the principle of the machine.

In order to prevent the lower ends of the spreader-bars from swinging sidewise I set the supporting-rods D at an angle with each other, as shown in Fig. 1, and so mount them upon the swing-frame E that their journals Z press against each other and prevent any side motion.

A degree of utility will be secured if the curve of the spreader-bars is simply the arc of a circle instead of the segment of a spiral, as shown in the drawings; and I do not wish to limit myself strictly to the curve of the spreader-bars shown.

Now, having described my invention, what I claim as new, and desire to secure by Letters Patent, is—

1. In a thrashing-machine feeder, the combination, with a suitable frame-work, of a cranked shaft journaled therein, depending curved spreader-bars journaled at their upper ends upon the cranks of the shaft and toothed on their under faces, and swinging supports connected with the lower ends of the spreader-bars, substantially as shown.

2. In a thrashing-machine feeder, the combination, with a suitable frame-work, of a cranked shaft, curved spreader-bars mounted at their upper ends upon the shaft, swinging supports for the lower ends of the spreaders, and a draper mounted below the latter, all substantially as shown.

3. In a thrashing-machine feeder, the combination, with a suitable frame-work, of a cranked shaft, curved spreader-bars mounted at their upper ends upon the shaft, swinging supports for the lower ends of the spreaders, a draper, and means, substantially such as shown, for causing the rotation of the shaft and travel of the draper in the same direction.

4. In a thrashing-machine feeder, the combination, with a suitable frame-work, of a cranked shaft, a series of curved toothed spreader-bars mounted at their upper ends upon the shaft, and swinging supports for the lower ends of the bars, the said bars increasing in curvature from their lower ends to their upper ends, substantially as shown.

5. In a thrashing-machine feeder, the combination, with a suitable frame-work, of a cranked shaft, a series of toothed curved spreader-bars mounted at their upper ends upon the shaft, and swinging supports for the lower ends of the bars, the length of the teeth and the angle they form with the spreader-bars increasing from the lower to the upper ends of the latter.

6. In a thrashing-machine, the combination, with a suitable frame-work, of a cranked shaft, a supplemental frame, as E, a series of swinging rods mounted thereon, spreader-bars carried by the crank-shaft and swinging rods, and a band or cord, M, secured at its opposite ends to the top and bottom of the frame E and passing at a point between its ends over the fixed pulley O.

7. In a thrashing-machine feeder, the combination, with the box R, of a draper, X, mounted therein, a pulley, K, adapted to impart motion to the draper, upright supports G, curved on the arc of a circle concentric with the pulley K, boxes F, mounted upon the supports G, a cranked shaft, B, journaled in the boxes F, and provided with a band-wheel, I, a belt, J, passing about pulleys I K, a series of spreader-bars mounted at their upper ends upon the crank-shaft, and swinging rods to support the lower ends of the spreader-bars, all substantially as shown.

8. In a thrashing-machine feeder, the combination, with the box R, of the draper X mounted therein, a cranked shaft, a series of depending spreader-bars carried by said shaft, swinging rods or supports for the lower ends of the spreader-bars, and means, substantially such as shown, for adjusting the spreader-bars toward and from the draper.

9. In a thrashing-machine feeder, the combination, as set forth, of the swing-frame E, staples Q, the box of the feeder, pawl U, ratchet T, cord M, and pulleys N, O, and P.

WILLIAM ELBERT PHILLIPS.

Witnesses:
JAS. R. TOWNSEND,
H. T. HAZARD.